United States Patent [19]
Derriman et al.

[11] Patent Number: 5,480,847
[45] Date of Patent: Jan. 2, 1996

[54] BRAKE ASSEMBLY

[75] Inventors: Lindsay E. Derriman, Kallaroo; Stephen M. A. Cortese, Shelley, both of Australia

[73] Assignee: Ceram-Eng Pty Ltd., Kallaroo, Australia

[21] Appl. No.: 603,779
[22] PCT Filed: May 1, 1989
[86] PCT No.: PCT/AU89/00185
   § 371 Date: Nov. 2, 1990
   § 102(e) Date: Nov. 2, 1990
[87] PCT Pub. No.: WO89/11052
   PCT Pub. Date: Nov. 16, 1989

[30] Foreign Application Priority Data

May 3, 1988 [AU] Australia ............... PI 8033

[51] Int. Cl.$^6$ ................ B60T 15/00; F16J 1/00
[52] U.S. Cl. ............... 501/128; 188/370; 92/222; 92/223
[58] Field of Search ............... 188/370; 92/222, 92/223; 501/128

[56] References Cited

U.S. PATENT DOCUMENTS 3,497,038 2/1970 Schrader et al. ............ 188/370
4,327,820 5/1982 Nakayama et al. ............ 188/370

FOREIGN PATENT DOCUMENTS 59-99130 6/1984 Japan ............ 188/370

OTHER PUBLICATIONS

Budworth, *An Introduction To Ceramic Science*, pp. 159–160, 1970.
Kingery, *Introduction To Ceramic;* pp. 404–407, 220 and 468, 1967.
Van Vlach, *Physical Ceramics for Engineers*, pp. 158–159, 1964.

Primary Examiner—C. Melissa Bonner
Attorney, Agent, or Firm—Knobbe, Martens, Olsen & Bear

[57] ABSTRACT

A hydraulic brake piston (11) is formed of a clay based ceramic or conventional ceramic material, such as a kaolin based ceramic with a low thermal conductivity. The piston (11) may be incorporated in a disc brake assembly comprising a caliper body (10) provided with a cylinder which receives the piston (11). Hydraulic brake fluid is introduced under pressure into the space (12) within the body (10) to displace the piston from the body and into contact with a disc pad (14). The ceramic piston retards heat transfer from the disc pad into the brake fluid thus reducing the cause for vapor lock.

8 Claims, 1 Drawing Sheet

BRAKE ASSEMBLY

BACKGROUND OF THE INVENTION

This invention relates to a brake assembly for a wheel.

A conventional disc brake assembly for a wheel of a vehicle comprises a cast iron or steel disc rotor (ventilated or solid) which is either joined or cast integrally with the wheel carrying hub and bearings to facilitate fitting to the axle stub, and when fitted the disc rotates with the wheel assembly. A brake caliper is then positioned such that it straddles each side of the disc rotor. This brake caliper assembly consists of a main body, usually either cast iron or cast alloy, which holds disc brake friction material pads in a position in relation to the disc such that the pads can be applied to each side of the disc rotor face. The brake caliper is manufactured such that it has the provision for one or more pistons which are slidably received into the caliper body. The caliper is hydraulically actuated from a master cylinder assembly which displaces brake fluid from a master cylinder through a brake line to the caliper. The brake fluid is introduced into the caliper under high pressure and results in displacement of the pistons in the caliper body out towards the disc face. The pistons act upon the friction material pads which result in the pads being forced against the disc. In practice these pistons have always been manufactured from steel or aluminium and the final finishing of them effected by either chrome plating or anodising.

A problem with steel hydraulic pistons is that they are usually very conductive to heat transfer. Thus upon continued braking of a wheel, the friction pads generate extreme heat which is then conducted by the hydraulic pistons and the caliper body to the brake fluid add to the seals. In order to minimize the possibility of such heat transferral causing the hydraulic brake fluid to vapourize, it has been necessary to design a brake fluid with increasingly higher boiling points. The currently acceptable disc brake fluid carries a nominated boiling point of approximately 270° C. This boiling point is only some 30° C. below the degradation point of the synthetic rubber seals which hydraulically seal the piston from the caliper body. If the brake fluid is contaminated with small amounts of water the boiling point can decrease to a about 140° C. It is a property of most brake fluids that they are hygroscropic and thus readily absorb moisture resulting in a significant decrease in the boiling point of the brake fluid. This can result in potentially dangerous brake failure known as "vapour lock" which occurs when the heat transferred from the disc pads to the hydraulic brake fluid results in the formation of small pockets of vapour.

Chromium plated steel pistons are the most common is disc brake systems but aluminium and titanium may be used in specialised cases. The aluminium and titanium pistons have the advantage of light weight and less corrosion compared to steel, but have a much higher thermal conductivity.

A further disadvantage with conventional pistons is that corrosion or pitting can occur on the surface of the piston or caliper due to environmental conditions or contaminated brake fluid. Such corrosion results in roughening of the surface of the piston which subsequently results in an accelerated degradation of the hydraulic seals by abrasion.

Furthermore engineers make a considerable effort to reduce the unsprung weight of automotive suspensions. With light weight pistons, the inertia of the braking system is reduced, leading to quicker reaction, as well as lower unsprung weight. As mentioned above, aluminium or titanium may be used in the pistons of brake assemblies to reduce weight, but these pistons suffer from corrosion and heat transfer problems.

The present invention has been devised with the general object of overcoming the above and other disadvantages by the use of nonmetallic pistons which have a low degree of thermal conductivity, are not generally subject to corrosion and can have the ability to absorb moisture from the brake fluid to reduce the possibility of vapour lock.

SUMMARY OF THE INVENTION

With the foregoing and other objects in view the invention in one form resides in a hydraulic brake piston formed of an unglazed clay based ceramic or conventional ceramic material wherein the ceramic material is formed and fixed to be permeable to water and/or water but not to hydraulic fluid.

In another form the invention resides in a brake assembly comprising at least one friction pad and at least one piston actuating said friction pad wherein said piston comprises an unglazed clay based or conventional ceramic material such as a kaolin based ceramic with a low thermal conductivity wherein the ceramic material is formed and fixed to be permeable to water and/or water vapour but not to hydraulic fluid.

It is preferred that the ceramic piston is porous to allow said material to absorb moisture from the brake fluid but whereby the piston will not absorb brake fluid.

In another form the invention resides in a hydraulic brake piston formed of a clay based or conventional ceramic material, such as a kaolin based ceramic.

BRIEF DESCRIPTION OF THE DRAWING

The invention will be better understood by reference to the following description of one specific embodiment thereof as shown in the accompanying drawing which is a schematic side sectional view of a brake calliper comprising the ceramic piston of this invention.

DETAILED DESCRIPTION OF THE PREFERRED EMBODIMENT OF THE INVENTION

Figure 1:
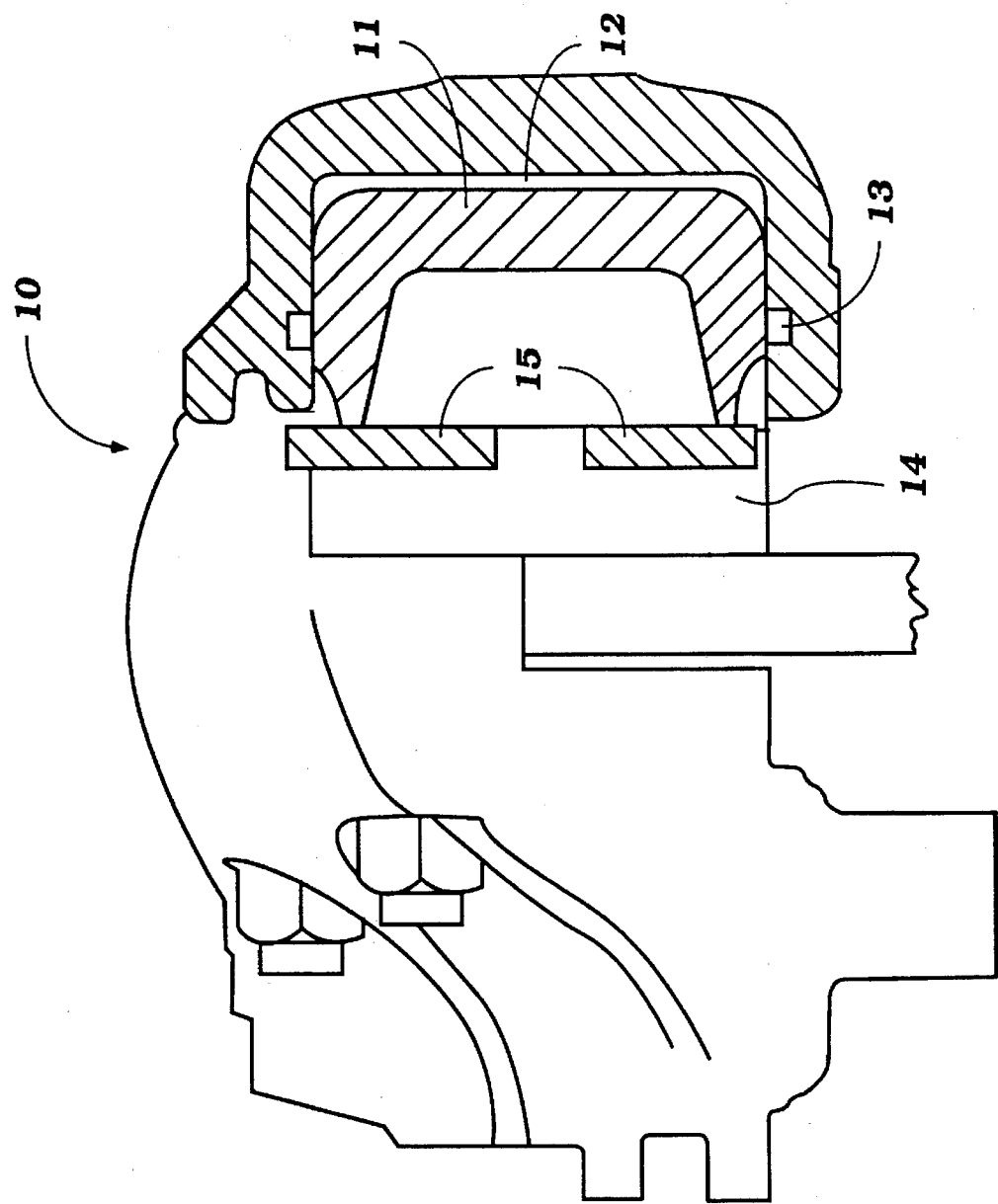

The embodiment is directed to a disc brake assembly for vehicles. The brake assembly comprises a caliper body 10 which is provided with a cylinder into which is received a ceramic piston 11. Hydraulic brake fluid is introduced under pressure into the space 12 within the caliper housing between the piston and the housing which results in displacement of the piston from the housing. A seal 13 is provided in the wall of the cylinder between the housing and the piston to prevent hydraulic brake fluid from flowing past the piston and out of the caliper assembly. A disc pad 14 is supported adjacent to the outer face of the piston and is optionally provided with anti-squeal shim 15 between the piston and disc pad. Upon introduction of hydraulic fluid into the caliper housing the piston is displaced out of the housing and presses up against the disc pad to press the disc pad onto a disc.

The piston is cup shaped with its closed face forming one side of the space 12. The walls of the piston are convergent towards the their outer edge to facilitate the removal of water that may have inadvertently entered the space between the piston and the pad 14. The ceramic from which the piston is formed comprises a clay based or conventional ceramic such as a kaolin based ceramic.

A typical clay based ceramic which may be used with the embodiment may have a composition of the following form:

| | |
|---|---|
| $SiO_2$ | 50%–70% |
| $Al_2O_3$ | 10%–40% |
| $K_2O$ | 0%–10% |
| CaO | 0%–5% |
| $Na_2O$ | 0%–10% |

In addition fluxes such as feldspar, nephelene syenite, cornish stone, silica and/or talc. This can result in a composition of the following form:

| | |
|---|---|
| $SiO_2$ | 50–70% |
| $Al_2O_3$ | 10–40% |
| $K_2O$ | 0–10% |
| CaO | 0–5% |
| $Na_2O$ | 0–10% |
| $Fe_2O_3$ | 0–2% |
| MgO | 0–5% |
| $TiO_2$ | 0–2% |
| MnO | 0–1% |

In a specific example of the embodiment the ceramic used in the construction of the piston is a standard tableware ceramic, based on Goomalling clay. The composition of the ceramic was designed to produce high grade vitrified tableware and is based on Goomalling clay with the addition of other materials to give a composition of:

| $ScO_2$ | $Al_2O_3$ | $Fe_2O_3$ | CaO | MgO | Na2O | $K_2O$ | $TiO_2$ | LO1* |
|---|---|---|---|---|---|---|---|---|
| 62.4 | 27.7 | 0.33 | 0.14 | 0.84 | 0.60 | 1.90 | 0.63 | 6.00 |

(*LO1 represents loss on ignition)

This is then fired at a temperature of 1200° C. to give a body which has controlled porosity which is determined by weighing the fired body, then placing body in water and boiling for 4 hours, allowing to cool in water, removing the surface water and re-weighing.

The properties of the ceramic piston when compared with the metal pistons currently in use (the conventional piston material is chromium plated steel, but aluminium and titanium are used in special circumstances).

COMPARATIVE COMPRESSIVE STRENGTHS IN KGS/SQ CM.

| CERAMIC | STEEL | ALUMINIUM | TITANIUM |
|---|---|---|---|
| 4500 | 5600 | 2800 | 7000 |

DENSITY IN GMS/CUBIC CM:

| CERAMIC | STEEL | ALUMINIUM | TITANIUM |
|---|---|---|---|
| 2.5 | 7.85 | 2.77 | 9.5 |

COMPARATIVE RUBBING FRICTION:

Readings of ammeter from a dynamic system with the piston held against a rotating disc on a dynamometer.

| CERAMIC | STEEL | ALUMINIUM | CHROME PLATED STEEL |
|---|---|---|---|
| 1.10 | 1.35 | 1.20 | 1.00 |

THERMAL CONDUCTIVITY Units W/m/°C.

| CERAMIC | STEEL | ALUMINIUM | TITANIUM |
|---|---|---|---|
| 1.30 | 45.30 | 224.77 | 15.56 |

THERMAL EXPANSION Linear × $10_{-5}$

| CERAMIC | STEEL | ALUMINIUM | TITANIUM |
|---|---|---|---|
| 0.02 | 0.633 | 1.244 | 0.49 |

The formation of the piston of the embodiment can be effected by a number of methods.

METHOD 1

The clay plus other components are blunged together in an ark, screened, filter pressed, filter cake dried and ground. Dry powder is then pressed in steel die at a pressure of 13790 kilonewtons/sq. meter. The fragile pressed piston is then removed from the die and placed in a furnace. Firing temperature is 1200° C. for about eight hours. The fired piston is then ground to finished size.

METHOD 2

As Method 1 but adding a small amount of organic binder such as gum tragacantb to increase the strength of the pressed body.

METHOD 3

Slip Casting

A deflocculated slip containing approximately 60% solids of the same composition as Method 1, and 2, is deflocculated using sodium silicate and sodium carbonate. The slip is then aged for 12 to 24 hours and then poured into plaster moulds to give the appropriate external form. The wall thickness is controlled by time—the fluid slip is decanted after a wall thickness of 10–15 mm has been built up. The mould is then allowed to slowly dry until sufficient shrinkage has occurred to allow cast to be removed from the mould. The cast is then dried, fired and ground as for Method 1 and 2.

METHOD 4

A mixture as Method 1 or 2 of the same composition, blunging, screening, filter pressing the mixture then feeding the filter cake to de-airing pug mill at about 80% solids to improve plasticity and workability. An extrusion press extrudes a column that is cut into pre determined lengths to give sufficient material to make the piston. This slug is then passed to a roller head cup making machine and spun into the required shape. The cup is then dried and fired in a conventional tunnel kiln.

Any other suitable forming technique can be used. In each method the porosity is controlled so that the piston is permeable to water vapour but not to conventional brake fluids. The permeability may be created by adding a component which burns out during firing, or by controlling the firing temperature so that the body is not completely vitrified.

The ceramic body is formed in order that the permeability is carefully controlled so that the water vapour may be transported through the body without the loss of brake fluid, i.e. the piston is designed to act as a filter to separate the hydraulic fluid from any water which has collected in the brake system. Heat generated at the interface of the piston and brake pad would mean that the face of the piston in contact would be hotter in use at time of application of the brakes. When the brake is released the disc and pad cool more rapidly than the caliper body assembly causing a temperature gradient across the piston from inner to outer faces. This temperature gradient will drive water vapour from the ceramic body and due to capilliary forces the pores in the piston body will draw into the piston any water or water vapour in the hydraulic fluid in contact with the piston. As the outer surface of the piston is in contact with the atmosphere evaporation will take place.

The advantages of the use of the ceramic piston according to this invention are that the ceramic piston can be in contact with a hot disc pad and will retard heat transfer into the brake fluid thus reducing the cause for vapour lock. Additionally a ceramic piston does not pit, corrode or rust and thus does not result in accelerated deterioration of the hydraulic seal surrounding the piston due to abrasion. An additional advantage of a ceramic piston with a low thermal conductivity is that thermal degradation of the hydraulic seal is also significantly reduced due to reduced temperatures of the portion of the piston in contact with the seal. The ceramic piston of this invention can also absorb moisture and dispose of such moisture without any operational damage to the ceramic piston. This particular property of the ceramic piston is extremely advantageous towards a minimisation of vapour lock. In addition the ceramic piston does not exhibit significant thermal expansion as do steel or aluminium pistons and thus will not seize into the caliper body. In addition the electrolytic neutrality of the ceramic material reduces the possibility of electrolytic attack of the cylinder.

Various other changes and modifications may be made to the embodiments described without departing from the spirit or scope of the invention.

The claims defining the invention are as follows:

1. A hydraulic brake piston slidable in a bore and actuated by a pressurized hydraulic fluid in said bore, the improvement comprising said piston being formed of a clay based ceramic material formed to be permeable to water and/or water vapor but not to the hydraulic fluid.

2. A hydraulic piston as set forth in claim 1 wherein the ceramic material is a kaolin based ceramic.

3. A hydraulic brake piston as claimed at claim 2, wherein the ceramic has the following composition.

| | |
|---|---|
| $SiO_2$ | 50%–70% |
| $Al_2O_3$ | 10%–%40% |
| $K_2O$ | 0%–10% |
| CaO | 0%–5% |
| $Na_2O$ | 0%–10% |

4. A hydraulic brake assembly comprising at least one friction pad and at least on piston actuating said friction pad the improvement comprising said piston being formed from a clay based ceramic material formed to have a low thermal conductivity and permeable to water and/or water vapor but not to hydraulic fluid.

5. A hydraulic brake assembly as claimed at claim 4 wherein the ceramic is a kaolin based ceramic.

6. A hydraulic brake assebly as claimed at claim 4, wherein the ceramic has the following composition:

| | |
|---|---|
| $SiO_2$ | 50%–70% |
| $Al_2O_3$ | 10%–%40% |
| $K_2O$ | 0%–10% |
| CaO | 0%–5% |
| $Na_2O$ | 0%–10% |

7. A hydraulic brake piston as set forth in claim 1 wherein the ceramic material is unglazed.

8. A disc brake assembly as set forth in claim 4 wherein the ceramic material is unglazed.

* * * * *